(12) United States Patent
Zhou et al.

(10) Patent No.: US 9,731,242 B2
(45) Date of Patent: Aug. 15, 2017

(54) PRESSURE SWING ADSORPTION DEVICE

(71) Applicants: XiaoShan Zhou, Anhui (CN); Ming Sun, Jiangsu (CN); Ji Lei, Guangzhou (CN)

(72) Inventors: XiaoShan Zhou, Anhui (CN); Ming Sun, Jiangsu (CN); Ji Lei, Guangzhou (CN)

(73) Assignee: IP TECH Pte. Ltd., Singapore (SG)

( * ) Notice: Subject to any disclaimer, the term of this patent is extended or adjusted under 35 U.S.C. 154(b) by 0 days.

(21) Appl. No.: 15/028,478

(22) PCT Filed: Nov. 6, 2013

(86) PCT No.: PCT/CN2013/086595
§ 371 (c)(1),
(2) Date: Apr. 11, 2016

(87) PCT Pub. No.: WO2015/035694
PCT Pub. Date: Mar. 19, 2015

(65) Prior Publication Data
US 2016/0279559 A1    Sep. 29, 2016

(30) Foreign Application Priority Data

Sep. 10, 2013   (CN) .......................... 2013 1 0413453

(51) Int. Cl.
*B01D 53/047*   (2006.01)
*B01D 53/06*   (2006.01)

(52) U.S. Cl.
CPC .......... *B01D 53/06* (2013.01); *B01D 53/047* (2013.01); *B01D 2253/108* (2013.01); *B01D 2253/116* (2013.01); *B01D 2259/40003* (2013.01)

(58) Field of Classification Search
CPC  B01D 53/047; B01D 53/06; B01D 2253/108; B01D 2253/116; B01D 2259/40003
(Continued)

(56) References Cited

U.S. PATENT DOCUMENTS

| | | | | |
|---|---|---|---|---|
| 4,353,720 A | * | 10/1982 | Margraf | ..................... B01J 8/18 422/171 |
| 5,169,414 A | * | 12/1992 | Panzica | .............. B01D 53/0431 95/113 |
| 6,517,610 B1 | * | 2/2003 | de la Houssaye | ..... B01D 53/06 95/107 |

FOREIGN PATENT DOCUMENTS

CN   1437503 A   8/2003
CN   1845779 A   10/2006
(Continued)

OTHER PUBLICATIONS

International Search Report of corresponding PCT/CN2013/086595 dated Jun. 10, 2014; 3 pgs.

*Primary Examiner* — Frank Lawrence
(74) *Attorney, Agent, or Firm* — Maier & Maier, PLLC (57) ABSTRACT

A pressure swing adsorption apparatus having: a housing with an arc-shaped inner surface, the housing being arranged with at least one gas inlet, at least one exhaust port and at least one gas outlet for discharging the separated gas; a rotor arranged in the housing, at least two contact ends being arranged on the rotor for maintaining a non-stop sliding contact with the inner surface of the housing, individual cavities, i.e., air cavities between the adjacent contact ends and formed between the external surface of the rotor and the inner surface of the housing, and each air cavity being separated by the contact ends; adsorption chambers set inside the rotor as parts of the rotor and rotated along with the rotor, molecular sieves being loaded in the interior of the adsorption chambers, and the adsorption chambers being (Continued)

provided with screen openings for connection with the air cavities.

9 Claims, 8 Drawing Sheets

(58) Field of Classification Search
USPC .............................. 96/125, 150; 95/107, 113
See application file for complete search history.

(56) References Cited

FOREIGN PATENT DOCUMENTS

| | | |
|---|---|---|
| CN | 100551490 C | 10/2009 |
| CN | 102755810 A | 10/2012 |
| CN | 203507775 U | 4/2014 |
| JP | 2007237004 A | 9/2007 |

* cited by examiner

--PRIOR ART--

PRESSURE SWING ADSORPTION DEVICE

TECHNICAL FIELD

The invention relates to a pressure swing adsorption device, which is mainly applied to the technical field of gas medium separation.

BACKGROUND

Pressure swing adsorption (abbreviated as PSA) has received attention from industries of various countries after emerging as a gas separation technology, with various industries developing and researching this technology competitively and the research has grown rapidly. The working principle of PSA is as follows: utilizing the differences of "adsorption" capabilities of adsorbent molecular sieves towards different gas molecules to separate gas mixtures; after adsorption equilibrium, according to the property that the molecular sieve adsorbs different quantity of gas under different pressures, lowering pressure so that the molecular sieve desorbs the adsorbed gas, the process of which is called regeneration. Currently, two or more columns connected in parallel are generally used in a pressure swing adsorption device, so that pressurization adsorption and depressurization regeneration can be conducted alternately, producing continuous product gas.

Figure 3:
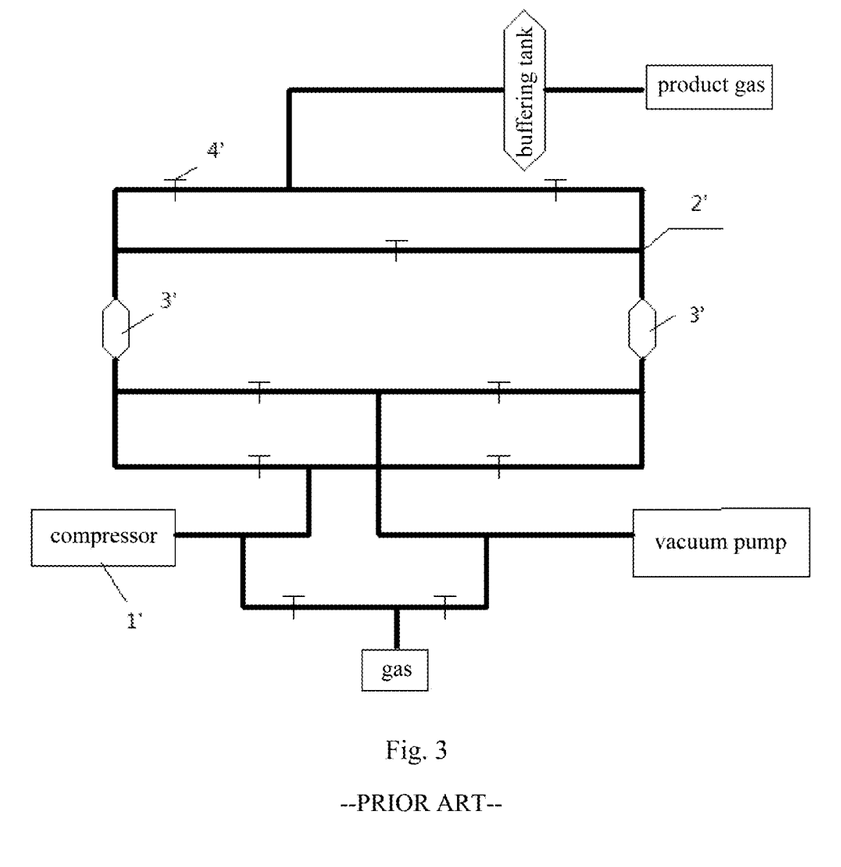
FIG. 3 is a schematic drawing of the structural principle of the existing pressure swing adsorption device.

Currently, most of the pressure swing adsorption devices in the market, shown in FIG. 3, primarily utilize molecular sieves to separate the gas entered into an adsorption column (tank) 3' through a conduit 2' after being compressed by a conventional compressor 1'. The conduit 2' is provided with a valve 4' thereon.

Such a device has the following drawbacks: a separated design, excessive parts, a bulky size, a loose structure, high pipe consumption and valve wear, low gas efficiency per unit power, requiring a complex control circuit, resulting in difficulties in synchronization control, poor reliability, and high cost.

BRIEF DESCRIPTION OF THE INVENTION

To solve the technical problem, the present invention provides a pressure swing adsorption device with a simple and compact structure, requiring no complex gas pipeline with an easy synchronization control, and omits a corresponding magnetic valve and a complex control circuit seen in a conventional device.

The present invention is realized by the following technical solutions: a pressure swing adsorption device, comprising:

a housing with an arc-shaped inner surface, the housing being provided with at least one gas inlet, at least one exhaust port, and at least one gas outlet that discharges separated gas;

a rotor provided in the housing, the rotor being provided with at least two contact ends, maintaining a non-stop sliding contact with the inner surface of the housing, an external surface of the rotor and the inner surface of the housing forming individual cavities, i.e., air cavities between adjacent contact ends, and each air cavity being separated by the contact ends;

an adsorption chamber provided inside the rotor, serving as a part of the rotor and rotating together with the rotor, the interior of the adsorption chamber being loaded with molecular sieves, and the adsorption chamber being provided with sieve openings corresponding to each gas cavity for communication with the air cavities.

Further, specifically, the individual cavities rotate with the rotor sequentially pass through the gas inlet, the gas outlet, and the exhaust port in each working cycle.

Further, the center of the rotor is not coincident with the center of the housing, and the center of the rotor rotates around the center of the housing during the rotor rotation.

As an optimized scheme, the pressure swing adsorption device further comprises a central shaft having an external gear, located at the center of the housing and driven by a motor to rotate, an internal gear being provided at the center of the rotor, the external gear of the central shaft being meshed with the internal gear of the rotor, and the external gear having fewer teeth than the internal gear.

As an optimized scheme, a pressure relief valve is provided at the gas outlet.

As a first optimized embodiment, the rotor is provided with three contact ends arranged clockwise, maintaining a non-stop sliding contact with the inner surface of the housing: a first contact end, a second contact end, and a third contact end; three air cavities are formed between the external surface of the rotor and the inner surface of the housing, and adsorption chambers corresponding to the three air cavities respectively are provided: a first adsorption chamber, a second adsorption chamber, and a third adsorption chamber, wherein the first adsorption chamber is between the first contact end and the second contact end, the second adsorption chamber is between the second contact end and the third contact end, and the third adsorption chamber is between the third contact end and the first contact end; the housing is provided with one gas outlet, one gas inlet, and one exhaust port; when the device is in an initial position, the first contact end of the rotor is at the clockwise side of the gas inlet, and the third contact end is at the counterclockwise side of the exhaust port, with the gas inlet and the gas outlet being located between the first contact end and the third contact end in the initial position, wherein the gas inlet is at the clockwise position of the exhaust port, and the gas outlet faces the second contact end directly.

In the above embodiment, an arc-shaped trajectory of the inner surface of the housing is obtained through the following equations:

$$x = R*\cos\alpha + e*\cos 3\alpha;$$

$$y = R*\sin\alpha + e*\sin 3\alpha;$$

the contour line of the rotor is obtained through the following equations:

$$v = 30 + t*60$$

$$d = -3*e*\sin(3*v)/R$$

$$u = 2*v - a\sin(d)$$

$$x = 2*e*\cos(u)*\cos(3*v) + R*\cos(2*v)$$

$$y = 2*e*\sin(u)*\cos(3*v) + R*\sin(2*v)$$

In the above equations, R is a generating radius, e is a distance between the center of the rotor and the center of the housing, $\alpha \in [0°, 360°]$, and t is time.

As a second optimized embodiment, the rotor is provided with four contact ends arranged clockwise, maintaining a non-stop sliding contact with the inner surface of the housing: a first contact end, a second contact end, a third contact end, and a fourth contact end; four air cavities are formed between the external surface of the rotor and the inner surface of the housing, and adsorption chambers corresponding to the four air cavities respectively are provided inside the rotor: a first adsorption chamber, a second adsorption chamber, a third adsorption chamber, and a fourth adsorption chamber, wherein the first adsorption chamber is between the first contact end and the second contact end, the second adsorption chamber is between the second contact end and the third contact end, the third adsorption chamber is between the third contact end and the fourth contact end, and the fourth adsorption chamber is between the fourth contact end and the first contact end; the housing is provided with one gas outlet, one gas inlet, a first exhaust port, and a second exhaust port; when the device is in an initial position, the first contact end of the rotor is at the clockwise side of the gas inlet, and the fourth contact end is at the counterclockwise side of the second exhaust port, with the gas inlet and the second exhaust port being located between the first contact end and the fourth contact end in the initial position, and the gas inlet is in a clockwise position of the second exhaust port, the first exhaust port is between the third contact end and the fourth contact end, and the gas outlet is between the second contact end and the third contact end and is adjacent to the third contact end.

In the second optimized embodiment, the arc-shaped trajectory of the inner surface of the housing is obtained through the following equations:

$$x = e^* \cos(\alpha) + R^* \cos(\alpha/4)$$

$$Y = e^* \sin(\alpha) + R^* \sin(\alpha/4)$$

the contour line of the rotor is obtained from the following equations:

$$x_r = e^* \cos \beta + e^* \cos(\alpha - \beta/3) + R^* \cos(\alpha/4 - \beta/3)$$

$$y_r = e^* \cos \beta + e^* \sin(\alpha - \beta/3) + R^* \sin(\alpha/4 - \beta/3)$$

$$tg(5\beta/8) = \frac{5\sin(\alpha/2) - K \sin(3\alpha/10)}{5\cos(\alpha/2) + K \cos(3\alpha/10)}$$

In the above equations, $\alpha \in [0°, 360°]$, e is an eccentric distance, R is a generating radius, and K=R/e.

The present invention has the following benefits:
compared with the conventional device, the present invention is more compact in structure due to arranging the adsorption chambers inside the rotor and it no longer requires a complex gas pipeline, and the on/off of the gas pipeline depends on the angle of the rotation of the rotor; it is easy to control synchronously, and the corresponding magnetic valve and the complex control circuit in the conventional device may also be reduced or omitted; gas separation is also performed synchronously with gas compression, realizing the integration function completely. The whole set of the device has a reasonable layout with a simple and compact structure, resulting to high gas efficiency, a reliable operation, and low cost. It is indeed a better and novel pressure swing adsorption device.

BRIEF DESCRIPTION OF THE DRAWINGS

FIGS. 1-1 to 1-6 are structural schematic drawings of the pressure swing adsorption device of embodiment 1 of the present invention;

FIG. 2-1 is a structural schematic drawing of the pressure swing adsorption device of embodiment 2 of the present invention;

FIG. 2-2 is a structural schematic drawing of the pressure swing adsorption device of embodiment 2 of the present invention;

FIG. 2-3 is a structural schematic drawing of the pressure swing adsorption device of embodiment 2 of the present invention;

FIG. 2-4 is a structural schematic drawing of the pressure swing adsorption device of embodiment 2 of the present invention;

FIG. 2-5 is a structural schematic drawing of the pressure swing adsorption device of embodiment 2 of the present invention;

FIG. 2-6 is a structural schematic drawing of the pressure swing adsorption device of embodiment 2 of the present invention;

FIG. 2-7 is a structural schematic drawing of the pressure swing adsorption device of embodiment 2 of the present invention; and FIG. 2-8 is a structural schematic drawing of the pressure swing adsorption device of embodiment 2 of the present invention.

DETAILED DESCRIPTION OF THE PRESENT INVENTION

The present invention is further described in detail in combination with the drawings and examples.

Figure 11:
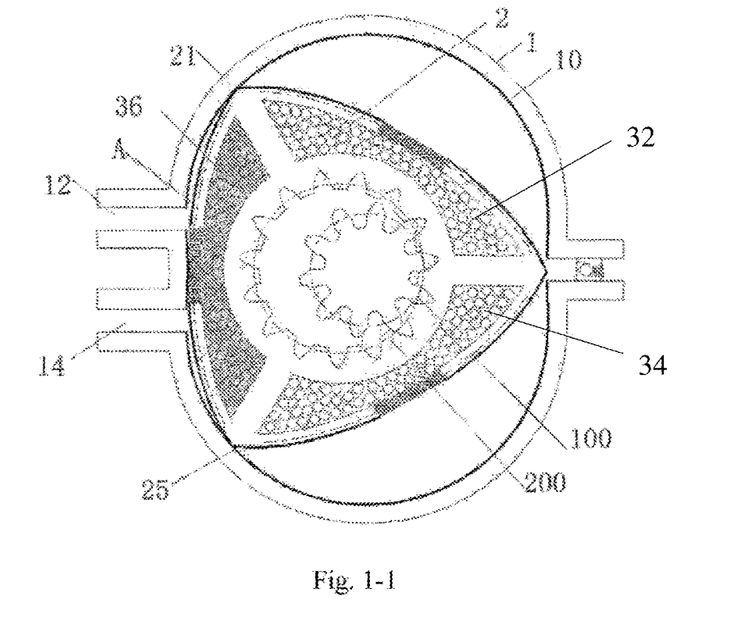

Embodiment 1:

FIGS. 1-1 to 1-6 are structural schematic drawings of the pressure swing adsorption device of the present invention; referring to FIG. 1-1, the pressure swing adsorption device comprises: a housing 1, a rotor 2, adsorption chambers 32, 34 and 36, wherein the housing 1 has an arc-shaped inner surface 10, and the arc-shaped trajectory of inner surface 10 is obtained through the following equations:

$$x = R^* \cos \alpha + e^* \cos 3\alpha;$$

$$y = R^* \sin \alpha + e^* \sin 3\alpha;$$

$$\alpha \in [0°, 360°] e = 1.5R = 10$$

The housing is provided with a gas inlet 12, an exhaust port 14, and a gas outlet 16 that discharges the separated gas. The contour line of the rotor 2 is obtained through the following equations:

$$e = 1.5R = 10$$

$$v = 30 + t^* 60$$

$$d = -3^* e^* \sin(3^* v)/R$$

$$u = 2^* v - a \sin(d)$$

$$x = 2^* e^* \cos(u)^* \cos(3^* v) + R^* \cos(2^* v)$$

$$y = 2^* e^* \sin(u)^* \cos(3^* v) + R^* \sin(2^* v)$$

The rotor 2 is provided inside the housing 1 and can rotate; the rotor 2 is provided with three contact ends maintaining a non-stop sliding contact with the inner surface 10 of the housing; the rotor 2 and the inner surface 10 of the housing form individual cavities, i.e., air cavities between adjacent contact ends, and the gas cavities rotate together with the rotor 2 to sequentially pass through the gas inlet 12, the gas outlet 16 and the exhaust port 14.

The adsorption chambers 32, 34 and 36 are provided inside the rotor 2 to serve as a part of the rotor and can rotate together with the rotor, wherein each adsorption chamber is provided with sieve openings in communication with the air cavities, and the interior of each adsorption chamber is loaded with molecular sieves respectively.

Specifically, in the present embodiment, the housing is provided with one gas outlet 16, one gas inlet 12, and one exhaust port 14, wherein the gas inlet 12 and the exhaust port 14 are provided on the left side of the housing 1, and the gas outlet 16 is provided on the right side of the housing 1. A pressure relief valve 160 is provided at the gas outlet 16.

The rotor 2 is provided with three contact ends labeled as contact ends 21, 23 and 25 respectively, and three adsorption chambers, labeled as adsorption chambers 32, 34 and 36 respectively, are separated by the three contact ends.

In the present embodiment, the center of the rotor 2 is not coincident with the center of the housing 1, and the center of the rotor 2 rotates around the center of the housing 1 during the rotor 2 rotation. More specifically, the housing 1 is provided with an external gear 100 at the center thereof, and the rotor 2 is provided with an internal gear 200 at the center thereof, wherein the external gear 100 is meshed with the internal gear 200, and the external gear 100 has fewer teeth than the internal gear 200.

The operating process of the pressure swing adsorption device of the present invention is as follows:

Referring to FIG. 1-1 which shows an initial phase, the contact end 21 of the rotor 2 is at the clockwise side of the gas inlet 12, and the contact end 25 is at the counterclockwise side of the exhaust port 14; that is, the air cavity formed by the adsorption chamber 36, the contact ends 21 and 25 and the inner surface 10 of the housing A is in an intake process of a new phase and an exhaust process of the last phase; the rotation of the internal gear 200 and the external gear 100 drives the rotor 2 to rotate clockwise, and after the contact end 25 moves clockwise beyond the exhaust port 14, the air cavity A begins to enter into an intake state completely. During this process, the volume of the air cavity A gradually increases.

Figure 12:
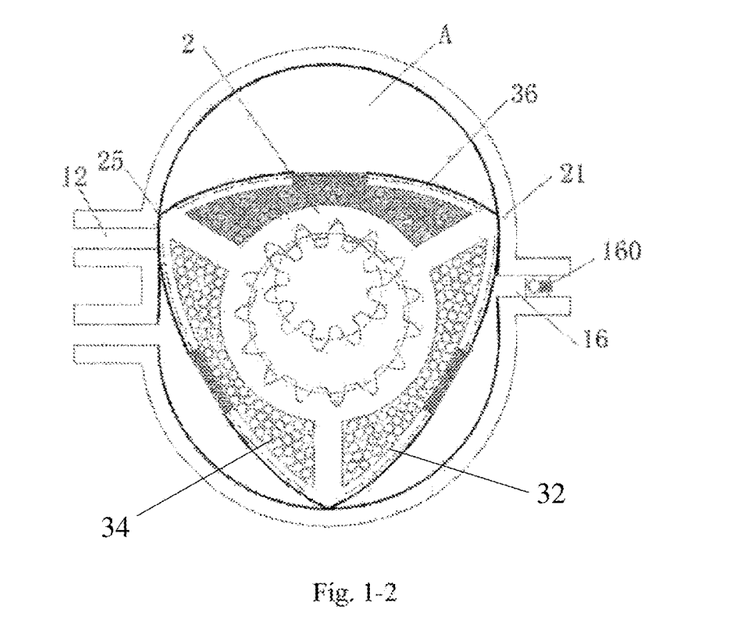

Referring to FIG. 1-2 which shows the maximum volume of air cavity A phase; as the rotor 2 rotates clockwise, the volume of the air cavity A reaches the maximum; the contact end 25 moves beyond the gas inlet 12, the contact 21 slides to the right side, the air cavity A is completely closed, and the intake process is completed. As the rotor 2 continuously rotates clockwise, the volume of the air cavity A gradually decreases.

Figure 13:
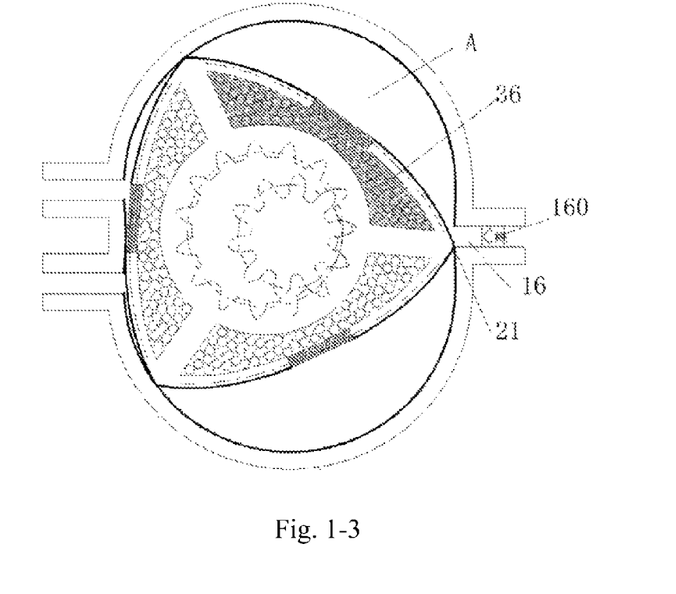

Referring to FIG. 1-3 which shows the compression process and exhaust preparation phase; the contact end 21 slides to the gas outlet 16, and as the rotor 2 continuously rotates clockwise, the volume of the air cavity A further decreases and is continuously compressed by the air cavity A, such that the gas pressure in the air cavity A gradually increases; and when the pressure is higher than the adsorption pressure of the molecular sieves, the molecular sieves begin to adsorb the corresponding gas. After a period of time, when all of the corresponding gases are completely adsorbed, and the gas pressure in the air cavity A is higher than the threshold value of the pressure relief valve 160, the pressure relief valve 160 is opened, and the gas in the air cavity A not being adsorbed by the adsorption chamber begins to exit through the gas outlet.

Figure 14:
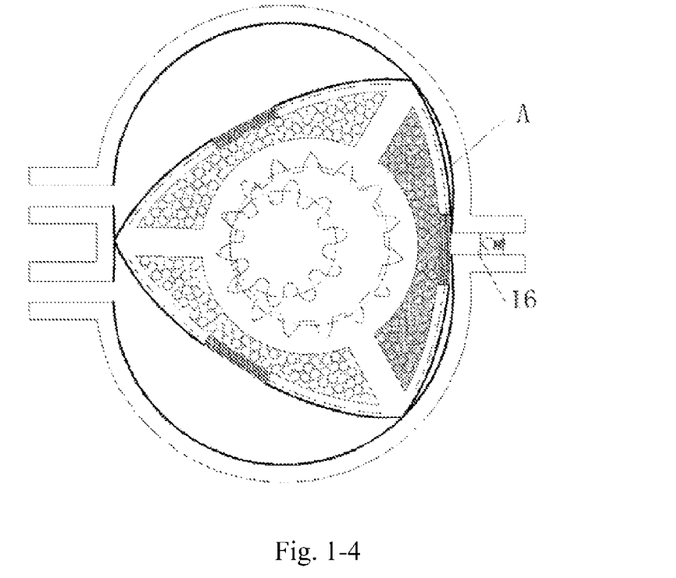

Referring to FIG. 1-4 which shows the minimum volume of air cavity A phase; as the rotor 2 continuously rotates clockwise, the volume of the air cavity A gradually decreases; in this phase, the volume of the air cavity A reaches the minimum, and the gas outlet 16 exhausts the gas continuously.

Figure 15:
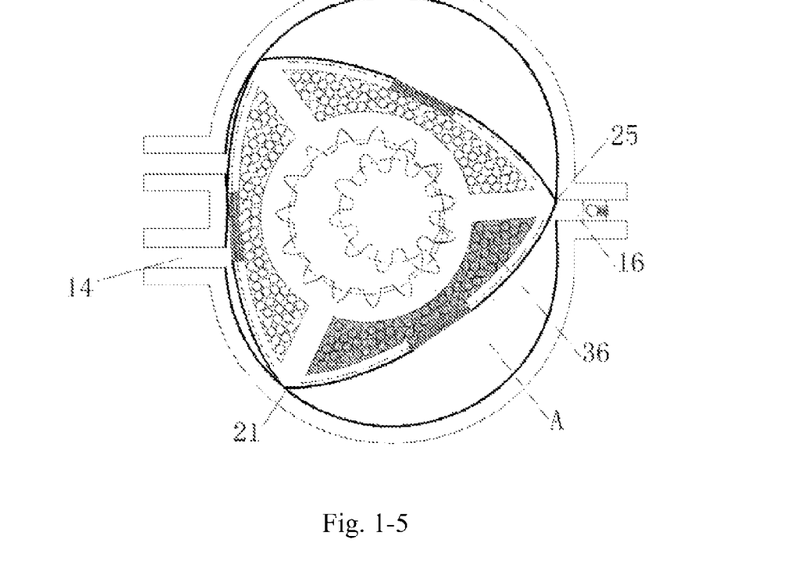

Referring to FIG. 1-5 which shows the exhaust preparation phase, as the rotor 2 continuously rotates clockwise, the contact end 25 slowly approaches the gas outlet 16, the volume of the air cavity A gradually increases, and the gas pressure in the air cavity A gradually decreases; when the gas pressure in the air cavity A is lower than the threshold value of the pressure relief valve 160, the pressure relief valve 160 begins to close. As the rotor rotates, the gas pressure in the air cavity A continuously decreases, and when the gas pressure in the air cavity A is lower than the desorption pressure of the molecular sieves, the molecular sieves begin to desorb the gas. Meanwhile, the adsorbed gas within the adsorption chamber 36 begins to enter into the air cavity A; the contact end 21 slides to the counterclockwise side of the exhaust port 14, and the air cavity A enters the exhaust preparation phase.

Figure 16:
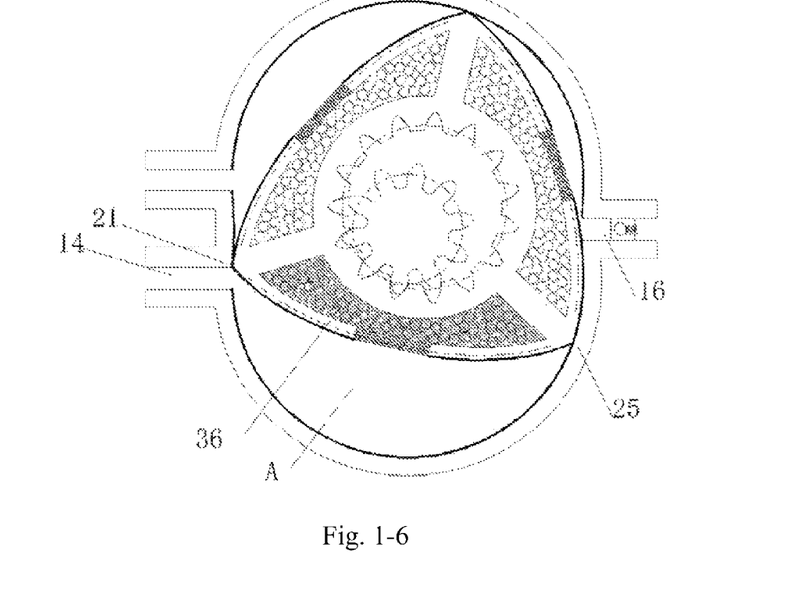

Referring to FIG. 1-6 which shows the gas exhausting phase, the contact end 21 moves beyond the exhaust port 14, and the contact end 25 slides over the gas outlet 16; the air cavity A is filled with gas desorbed by the adsorption chamber 36, and the air cavity A completely enters the gas exhausting phase.

Continuing referring to FIG. 1-1. At this point, a working cycle process of an air cavity and a corresponding adsorption chamber is completed.

Figure 21:
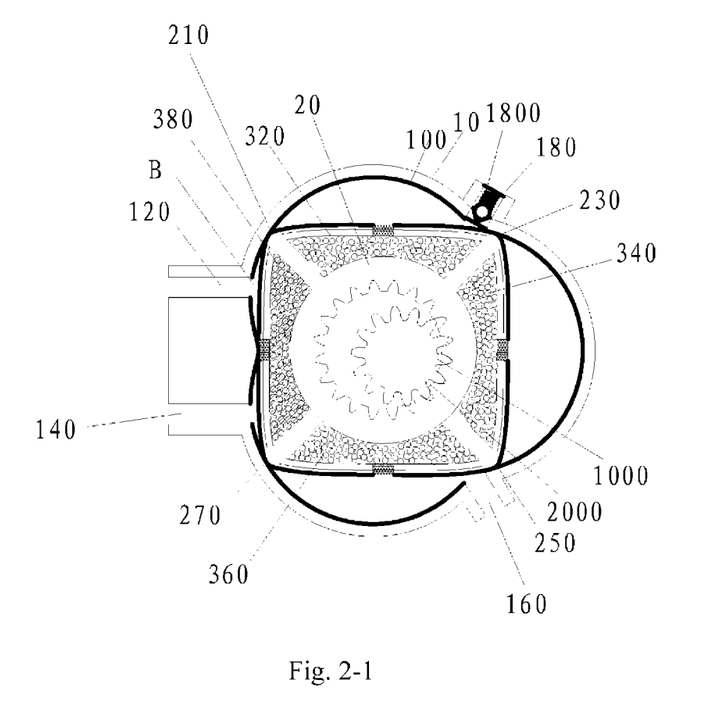

Embodiment 2:

FIGS. 2-1 to 2-8 are structural schematic drawings of the pressure swing adsorption device of the present invention; referring to FIG. 2-1, the pressure swing adsorption device comprises: a housing 10, a rotor 20, adsorption chambers 320, 340 and 380, wherein the housing 10 has an arc-shaped inner surface 100, an arc-shaped trajectory obtained through the following equations:

$$x = e^* \cos(\alpha) + R^* \cos(\alpha/4)$$

$$Y = e^* \sin(\alpha) + R^* \sin(\alpha/4)$$

$\alpha \in [0°, 360°]$, e is an eccentric distance, and e=12; R is a generating radius, and R=96.

The housing is provided with a gas inlet 120, a second exhaust port 140, a first exhaust port 160, and a gas outlet 180 that is used for discharging the separated gas; a contour line of the rotor 20 is obtained through the following equations:

$$x_r = e^* \cos \beta + e^* \cos(\alpha - \beta/3) + R^* \cos(\alpha/4 - \beta/3)$$

$$y_r = e^* \cos \beta + e^* \sin(\alpha - \beta/3) + R^* \sin(\alpha/4 - \beta/3)$$

$$tg(5\beta/8) = \frac{5\sin(\alpha/2) - K \sin(3\alpha/10)}{5\cos(\alpha/2) + K \cos(3\alpha/10)}$$

$\alpha \in [0°, 360°]$, e is an eccentric distance, and e=12; R is a generating radius, and R=96. K=R/e.

The rotor 20 is provided inside the housing 10 and can rotate. The rotor 20 is provided with four contact ends that maintains a non-stop sliding contact with the inner surface 100 of the housing; the rotor 20 and the inner surface 100 of the housing form individual cavities, i.e., air cavities between adjacent contact ends, and the air cavities rotate together with the rotor 20 to sequentially pass through the gas inlet 120, the gas outlet 180, the first exhaust port 160, and the second exhaust port 140.

The adsorption chambers 320, 340, 360 and 380 are provided inside the rotor 20 to serve as a part of the rotor 20 and can rotate together with the rotor 20; each adsorption chamber is provided with sieve openings in communication with the air cavities, and the interior of each adsorption chamber is loaded with molecular sieves respectively.

Specifically, in the present embodiment, the housing 10 is provided with a gas outlet 180, a gas inlet 120, a second exhaust port 140, and a first exhaust port 160; the gas inlet 120 and the second exhaust port 140 are provided on the left side of the housing 10, and the gas outlet 180 and the first exhaust port 160 are provided on the right side of the housing 10. A pressure relief valve 180 is provided at the gas outlet 180.

The rotor 20 is provided with four contact ends labeled as contact ends 210, 230, 250 and 270 respectively, and four adsorption chambers, labeled as adsorption chambers 320, 340 360, and 380 respectively, are separated by the four contact ends.

In the present embodiment, the center of the rotor 20 is not coincident with the center of the housing 10, and the center of the rotor 20 rotates around the center of the housing during the rotation of the rotor 2. More specifically, the housing 10 is provided with an external gear 1000 at the center thereof, and the rotor 20 is provided with an internal gear 2000 at the center thereof; the external gear 1000 is meshed with the internal gear 2000, and the external gear 1000 has fewer teeth of the internal gear 2000.

The operating process of the pressure swing adsorption device of the present invention is as follows:

Referring to FIG. 2-1 which shows the initial phase, the contact end 210 of the rotor 20 is on the clockwise side of the gas inlet 120, and the contact end 270 is on the counterclockwise side of the second exhaust port 140; that is, the air cavity B formed by the adsorption chamber 380, the contact ends 210 and 270, and the inner surface 100 of the housing is in an intake process of a new phase and an exhaust process of the last phase; the rotation of the internal gear 2000 and the external gear 1000 drives the rotor 20 to rotate clockwise, and in this process, the volume of the air cavity B gradually increases.

Figure 22:
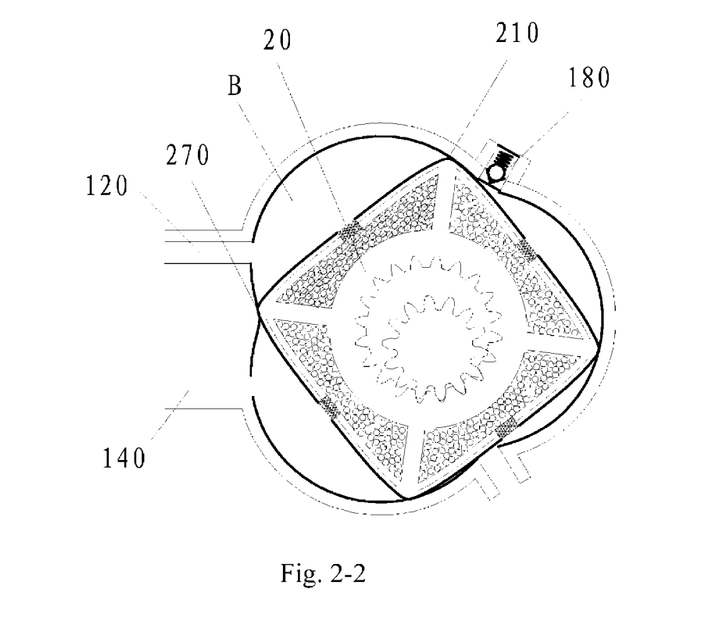

Referring to FIG. 2 which shows the continuous gas intaking and exhaust preparation phase. As the rotor 20 is rotated clockwise, after the contact end 270 moves clockwise beyond the second exhaust port 140, the air cavity B completely enters into an intake state with the volume thereof gradually increasing, and the contact end 210 slides to the right side near the gas outlet 180. Again, as the rotor 20 continuously rotates clockwise, the volume of the air cavity B will gradually decrease.

Figure 23:
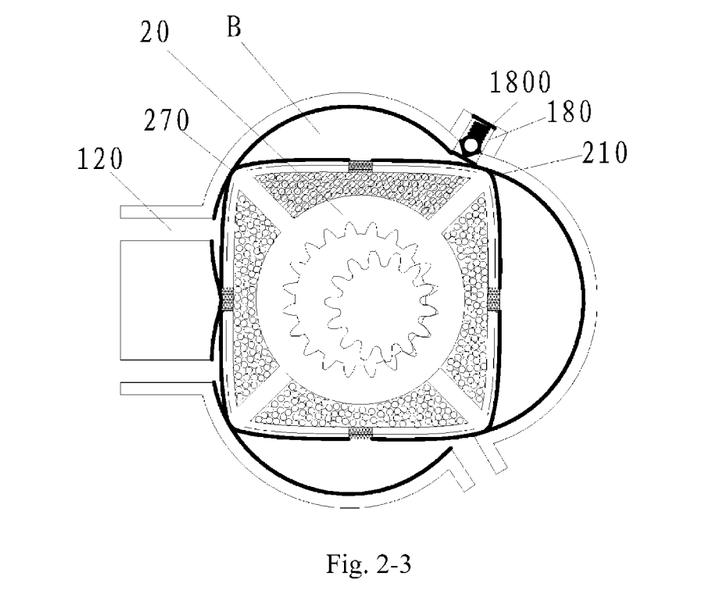

Referring to FIG. 2-3 which shows the compression process and gas exhausting start phase. As the rotor 20 continuously rotates clockwise, the air cavity B continuously compresses the volume thereof, and as the volume of the air cavity B gradually decreases, the gas pressure in the air cavity B gradually increases; and when the pressure is higher than the adsorption pressure of the molecular sieves, the molecular sieves begin to adsorb corresponding gases. After a period of time, when all of the corresponding gases are completely adsorbed and the gas pressure in the air cavity B is higher than the threshold value of the pressure relief valve 180, the pressure relief valve 180 is opened, and the gas in the air cavity B not being adsorbed by the adsorption chamber 380 begins to exit through the gas outlet 180.

Figure 24:
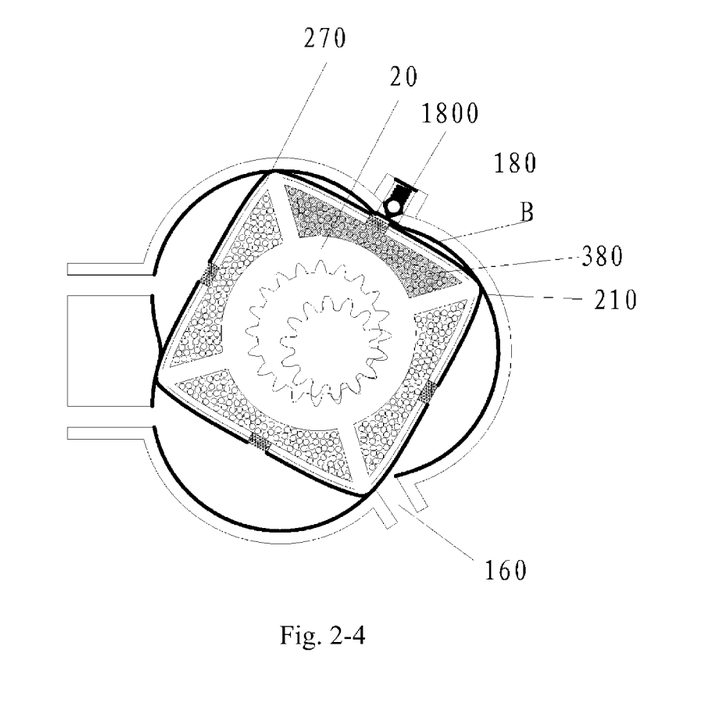

Referring to FIG. 2-4 which shows the minimum volume of air cavity B phase; as the rotor 20 continuously rotates clockwise, the volume of the air cavity B continuously decreases, and the air cavity B keeps exhausting the gas continuously; in this phase, the volume of the air cavity B reaches the minimum. When the gas pressure in the air cavity B is lower than the threshold value of the pressure relief valve 180, the pressure relief valve 180 begins to close.

Figure 25:
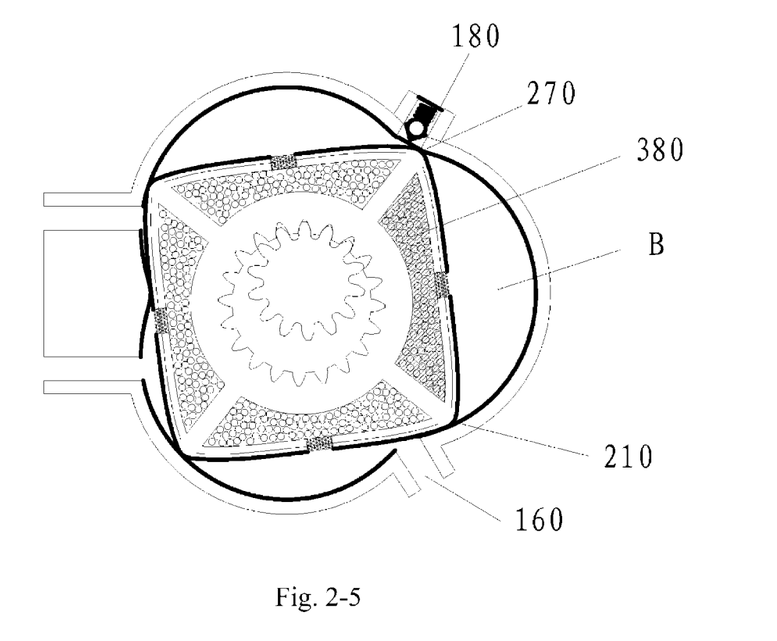

Referring to FIG. 2-5 which shows the exhaust preparation phase; as the rotor 20 continuously rotates clockwise, the contact end 270 slowly approaches the gas outlet 180, and the volume of the air cavity B gradually increases while the gas pressure in the air cavity B gradually decreases; when the gas pressure is lower than the desorption pressure of the molecular sieves, the molecular sieves begin to desorb the gas. Meanwhile, the gas adsorbed in the adsorption chamber 380 begins to enter into the air cavity B; the contact end 210 slides to the right side of the first exhaust port 160, and the air cavity B enters into the first exhaust preparation phase.

Figure 26:
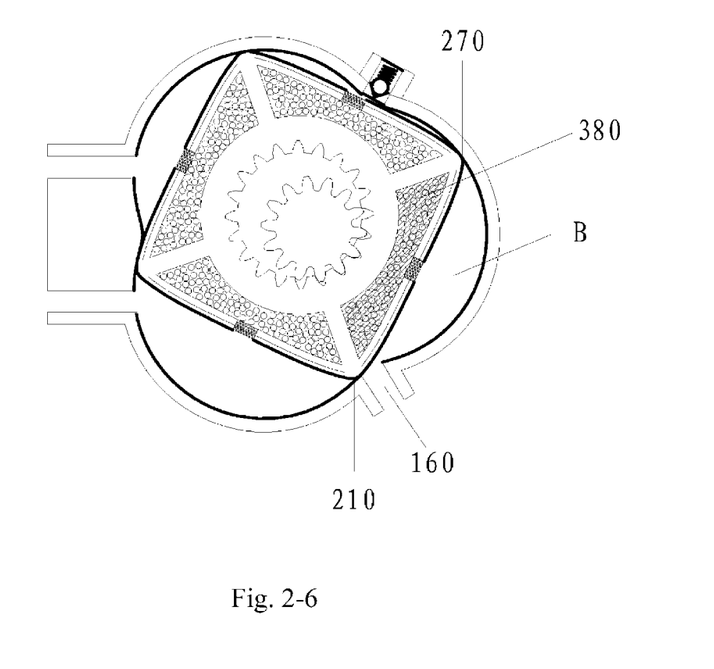

Referring to FIG. 2-6 which shows the first exhaust phase; as the rotor continuously rotates clockwise, the contact end 210 begins to slide over the first exhaust port 160, and the air cavity B is filled with gas desorbed by the adsorption chamber 380; the air cavity B enters into the first exhaust phase.

Figure 27:
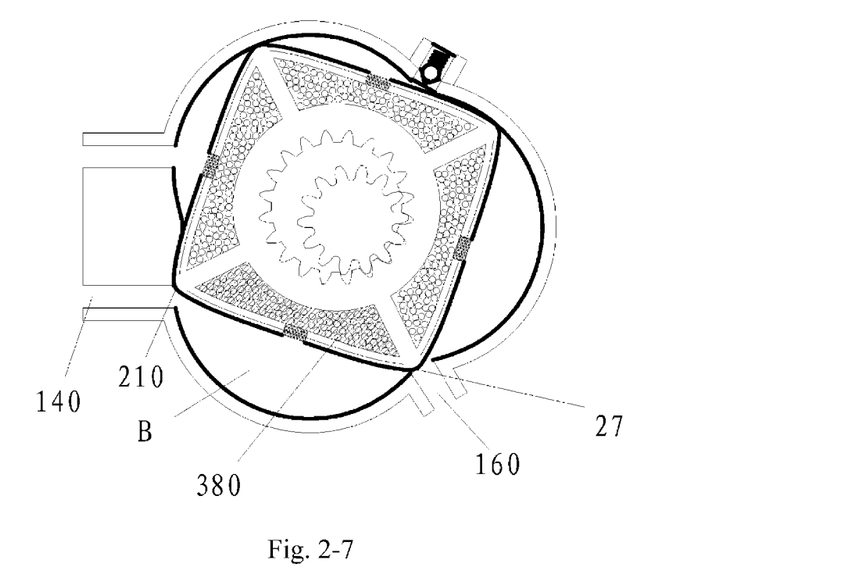

Referring to FIG. 2-7 which shows the double exhaust phase. The contact end 270 does not completely slide over the first exhaust port 160, and the contact end 210 slides over the second exhaust port 140; the adsorption chamber 380 keeps exhausting the adsorbed gas, and the second exhaust has already started when the first exhaust is not finished; Meanwhile, the gas is exhausted from the first exhaust port 160 and the second exhaust port 140 simultaneously.

Figure 28:
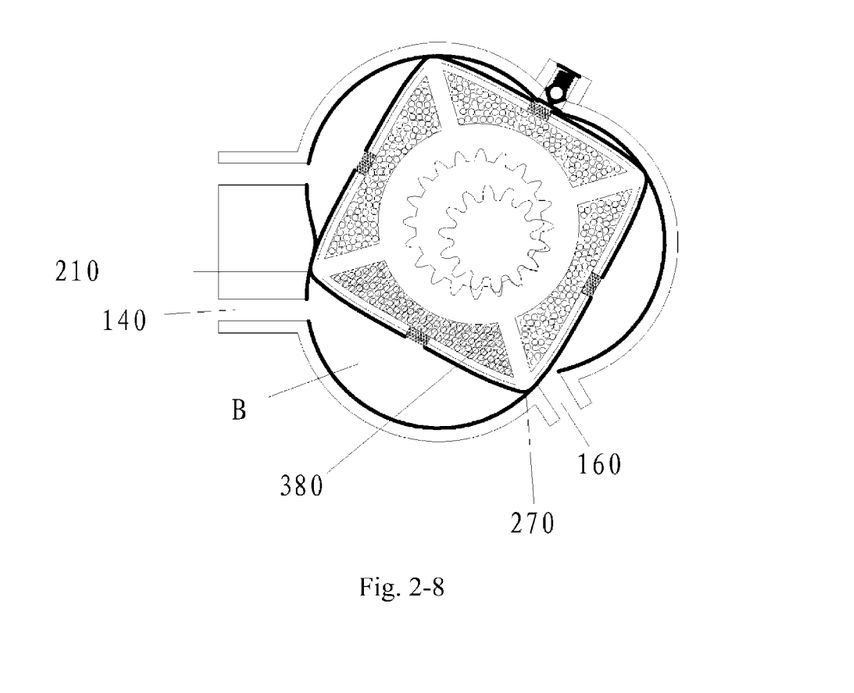

Referring to FIG. 2-8 which shows the complete exhaust phase. The contact end 270 completely slides over the first exhaust port 160, and the contact end 210 also moves beyond the second exhaust port 140. Meanwhile, there is still some gas released from the adsorption chamber 380 existing in the air cavity B, and the remaining gas is exhausted by the second exhaust port 140.

Continuing to refer to FIG. 2-1, at this time, a working cycle process of an air cavity and a corresponding adsorption chamber is completed.

The above embodiments are only for illustrating technical concepts and features of the present invention, and aim at enabling those skilled in the art to understand and implement the content of the present invention, rather than to limit the scope of the present invention. All of the equivalent variations and modifications made according to the spirit of the present invention fall within the protection scope of the present invention.

What is claimed is:

1. A pressure swing adsorption device, comprising:
   a housing having an arc-shaped inner surface, the housing being provided with at least one gas inlet, at least one exhaust port, and at least one gas outlet used for discharging separated gas;
   a rotor provided inside the housing, the rotor being provided with at least two contact ends, maintaining a non-stop sliding contact with the inner surface of the housing, an external surface of the rotor and the inner surface of the housing forming air cavities between adjacent contact ends, and each air cavity being separated by the contact ends;
   an adsorption chamber, provided inside the rotor, serving as a part of the rotor and rotating together with the rotor, the interior of the adsorption chamber being loaded with molecular sieves, and the adsorption chamber being provided with screen openings corresponding to each air cavity for communication therewith.

2. The pressure swing adsorption device of claim 1, wherein the individual cavities rotate with the rotor to sequentially pass through the gas inlet, the gas outlet, and the exhaust port in each working cycle.

3. The pressure swing adsorption device of claim 1, wherein a center of the rotor is not coincident with a center of the housing, and the center of the rotor rotates around the center of the housing during the rotor rotation.

4. The pressure swing adsorption device of claim 3, wherein the pressure swing adsorption device further comprises a central shaft having an external gear, located at the center of the housing and driven by a motor to rotate, an internal gear being provided at the center of the rotor, the external gear of the central shaft being meshed with the internal gear of the rotor, and the external gear having fewer teeth than the internal gear.

5. The pressure swing adsorption device of claim 1, wherein a pressure relief valve is provided at the gas outlet.

6. The pressure swing adsorption device of claim 4, wherein the rotor is provided with three contact ends arranged clockwise, maintaining a non-stop sliding contact with the inner surface of the housing, comprising: a first contact end, a second contact end, and a third contact end; three air cavities are formed between the external surface of the rotor and the inner surface of the housing, and adsorption chambers corresponding to the three air cavities respectively are provided inside the rotor comprising: a first adsorption chamber, a second adsorption chamber, and a third adsorption chamber, wherein the first adsorption chamber is between the first contact end and the second contact end, the second adsorption chamber is between the second contact end and the third contact end, and the third adsorption chamber is between the third contact end and the first contact end; the housing is provided with one gas outlet, one gas inlet and one exhaust port; when the device is in an initial position, the first contact end of the rotor is at a clockwise side of the gas inlet, and the third contact end is at a counterclockwise side of the exhaust port with the gas inlet and the gas outlet located between the first contact end and the third contact end in the initial position, and the gas inlet is at a clockwise position of the exhaust port, and the gas outlet faces the second contact end directly.

7. The pressure swing adsorption device of claim 6, wherein an arc-shaped trajectory of the inner surface of the housing is obtained through the following equations:

$x=R*\cos\alpha+e*\cos 3\alpha;$ $y=R*\sin\alpha+e*\sin 3\alpha;$ a contour line of the rotor is obtained through the following equations:

$v=30+t*60$ $d=-3*e*\sin(3*v)/R$ $u=2*v-a\sin(d)$ $x=2*e*\cos(u)*\cos(3*v)+R*\cos(2*v)$ $y=2*e*\sin(u)*\cos(3*v)+R*\sin(2*v)$ in the above equations, R is a generating radius, e is a distance between the center of the rotor and the center of the housing, $\alpha \in [0°, 360°]$, and t is time.

8. The pressure swing adsorption device of claim 4, wherein the rotor is provided with four contact ends arranged clockwise, maintaining a non-stop sliding contact with the inner surface of the housing, comprising: a first contact end, a second contact end, a third contact end, and a fourth contact end; four air cavities are formed between the external surface of the rotor and the inner surface of the housing, and adsorption chambers corresponding to the four air cavities respectively are provided inside the rotor comprising: a first adsorption chamber, a second adsorption chamber, a third adsorption chamber, and a fourth adsorption chamber, wherein the first adsorption chamber is between the first contact end and the second contact end, the second adsorption chamber is between the second contact end and the third contact end, the third adsorption chamber is between the third contact end and the fourth contact end, and the fourth adsorption chamber is between the fourth contact end and the first contact end; the housing is provided with one gas outlet, one gas inlet, a first exhaust port, and a second exhaust port; when the device is in an initial position, the first contact end of the rotor is at the clockwise side of the gas inlet, and the fourth contact end is at the counterclockwise side of the second exhaust port, with the gas inlet and the second exhaust port being located between the first contact end and the fourth contact end in the initial position, and the gas inlet is at the clockwise position of the second exhaust port, the first exhaust port is between the third contact end and the fourth contact end, and the gas outlet is between the second contact end and the third contact end and is adjacent to the third contact end.

9. The pressure swing adsorption device of claim 8, wherein the arc-shaped trajectory of the inner surface of the housing is obtained through the following equations:

$x=e*\cos(\alpha)+R*\cos(\alpha/4)$ $Y=e*\sin(\alpha)+R*\sin(\alpha/4)$ the contour line of the rotor is obtained from the following equations:

$xr=e*\cos\beta+e*\cos(\alpha-\beta/3)+R*\cos(\alpha/4-\beta/3)$ $yr=e*\cos\beta+e*\sin(\alpha-\beta/3)+R*\sin(\alpha/4-\beta/3)$ $$tg(5\beta/8) = \frac{5\sin(\alpha/2) - K\ \sin(3\alpha/10)}{5\cos(\alpha/2) + K\ \cos(3\alpha/10)}$$

In the above equations, $\alpha \in [0°, 360°]$, e is an eccentric distance, R is a generating radius, and K=R/e.

* * * * *